United States Patent [19]

Schubert

[11] Patent Number: 4,730,337
[45] Date of Patent: Mar. 8, 1988

[54] METHOD AND APPARATUS FOR OPERATING A DIRECT-CURRENT ARC FURNACE

[75] Inventor: Manfred Schubert, Oberhausen, Fed. Rep. of Germany

[73] Assignee: MAN Gutehoffnungshütte GmbH, Fed. Rep. of Germany

[21] Appl. No.: 854,317

[22] Filed: Apr. 21, 1986

[30] Foreign Application Priority Data

Apr. 29, 1985 [DE] Fed. Rep. of Germany ....... 3515438

[51] Int. Cl.$^4$ .......................... H05B 7/02; H05B 7/20
[52] U.S. Cl. ....................................... 373/72; 373/108
[58] Field of Search ...................... 373/36, 37, 38, 72, 373/108, 88, 107

[56] References Cited

U.S. PATENT DOCUMENTS

| | | |
|---|---|---|
| 4,137,422 | 1/1979 | Barbashin .......................... 373/72 X |
| 4,435,812 | 3/1984 | Guido et al. .......................... 373/72 |
| 4,566,108 | 1/1986 | Bühler .................................. 373/108 |
| 4,601,041 | 7/1986 | Müller ................................. 373/108 |
| 4,628,516 | 12/1986 | Voss-Spilker ......................... 373/72 |

Primary Examiner—Roy N. Envall, Jr.
Attorney, Agent, or Firm—McGlew and Tuttle

[57] ABSTRACT

In a direct-current arc furnace, the service life of the bottom electrode can be extended substantially, if the cooling unit cooling the bottom electrode during the melting operations is not switched off during longer stoppages, as has been customary thus far, but continues to be operated at a reduced cooling output during at least a part of the stoppage. The cooling unit is preferably controlled during the stoppage according to such a program and in dependence of the respective measured temperature of the bottom electrode, so that the temperature of the bottom electrode is maintained within a preset range.

8 Claims, 2 Drawing Figures

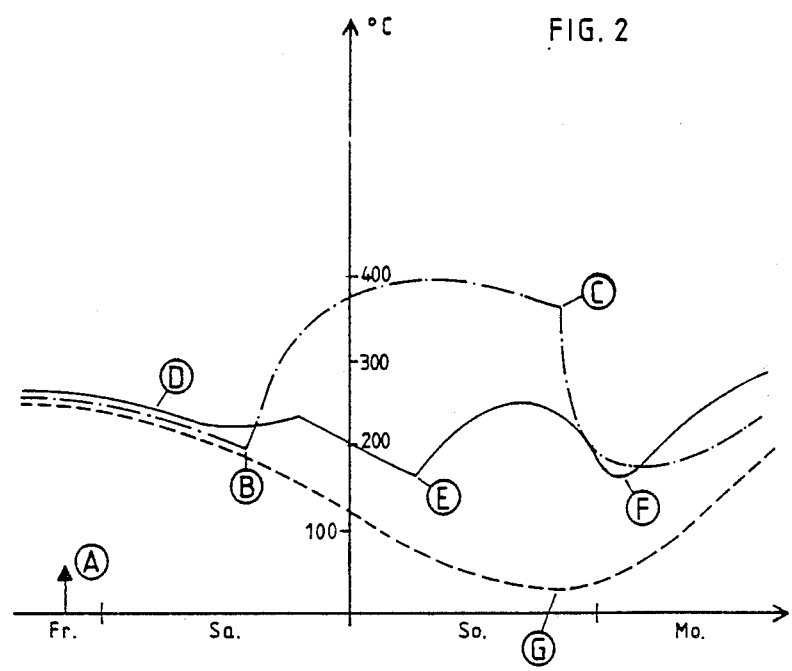

METHOD AND APPARATUS FOR OPERATING A DIRECT-CURRENT ARC FURNACE

FIELD AND BACKGROUND OF THE INVENTION

The invention relates in general to heating furnaces and in particular to a new and useful method for operating an arc furnace with a bottom electrode and to an apparatus for executing the method.

A similar direct-current arc furnace is known from the periodical "Elktrowärme International" (Electric Heating International) 41, (1983). A cooling system for the bottom electode of such a furnace is the object of German Pat. No. 31 06 741.

It has become apparent during the operation of such furnaces that the service life of the bottom electrode does not meet expectations. It has been shown that in the area of the bottom electrode, cracks appear in the refractory material, into which the melt can penetrate. Increased efforts were made, therefore, to ascertain the causes for the relatively short service life of the bottom electrode and eliminate them as far as possible.

SUMMARY OF THE INVENTION

The invention provides a construction and method to improve the service life of the bottom electrode of a direct-current arc furnace.

According to the invention, it was found surprisingly that the determinative causes of the short service life ought not to be sought mainly in the conditions during the melting and tapping operation, but to a considerable extent also in the conditions obtaining during the regular shutdowns, e.g., on weekends.

Accordingly it is an object of the invention to provide a method for operating a direct-current arc furnace which has a bottom electrode in a cooling unit for cooling the bottom of the furnace which comprises operating the cooling unit during the melting and tapping operation so as to cool the bottom electrode and maintain it at a substantially constant operating temperature and during longer stoppages operating the cooling unit at reduced cooling output for at least a part of the stoppage.

A further object of the invention is to provide an arc furnace which has a bottom electrode and which includes a cooling unit mounted below the furnace in the vicinity of the electrode providing a cooling flow thereover and which includes means for regulating the cooling flow so as to cool the bottom electrode in accordance with the monitored temperature of the electrodes.

A futher object of the invention is to provide an apparatus for cooling an electrode furnace which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 shows typical temperature curves at the bottom electrodes with and without application of the method according to the invention.

DESCRIPTION OF THE PREFERRED EMBODIMENT

Figure 1:
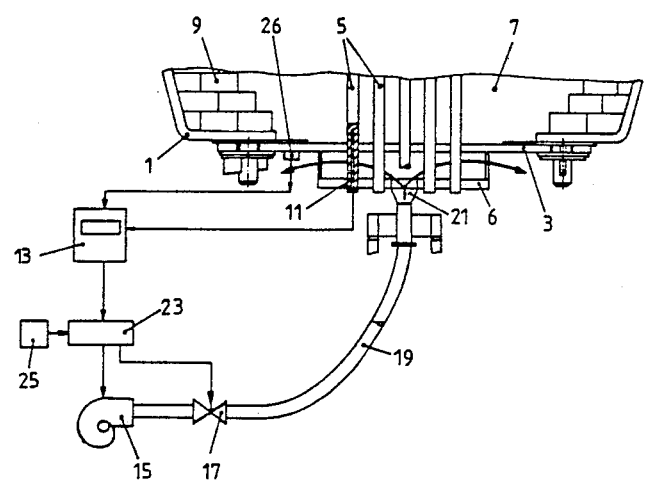
FIG. 1 is a diagrammatic sectional representation of the bottom electrodes of a direct-current arc furnace with cooling and control device appertaining thereto, according to the invention.

Referring to the drawings in particular, the invention embodied therein comprises a method for operating a direct-current arc furnace which has an outer wall 1 with a bottom electrode or electrodes 5 arranged therein and which during the melting and tapping operation is cooled by a cooling unit including in the embodiment illustrated, a fan 15 so as to maintain the electrodes at a substantially constant operating temperature which does not vary to any great amount. In accordance with a feature of the method of the invention, during longer stoppages of the furnace, the cooling unit is operated at a reduced cooling output for at least a part of the stoppage.

FIG. 1 shows a sectional view of the lower portion of a metallic wall 1 of a furnace vessel to which, in the bottom zone, an electrically insulated mounting plate 3 is attached, which carries a number of electrode or contact pins 5 that project vertically through the refractory tamping clay 7 situated on the mounting plate 3 and contact the melt (not shown). A refractory brick lining 9 is indicated in the region of the furnace wall 1.

One, several, or preferably all contact pins are provided with a boring 11 in which is arranged a temperature sensor (not represented), e.g., in the form of a thermocouple element, in order to measure the temperature of the contact pin 5. The temperature sensors are connected by means of wires to an appropriate display and monitoring unit 13 which is arranged at an appropriate distance from the furnace, e.g., in the control room. The orderly melting operation can be monitored with the aid of the displayed and/or monitored temperatures and can be stopped, e.g., when dangerous situations appear. In addition, continuous monitoring of the temperatures of the contact pins provides an indication as to when the wear and tear of the refractory tamping clay 7 has advanced so far that it has to be replaced.

At a distance below the mounting plate 3, there is a base plate 6, and the necks of the electrode or contact pins 5 preferably project through the base plate 6. The interspace between base plate 6 and mounting plate 3, and thus also the necks of the electrodes 5, can be cooled by means of an air current that is fed by a fan 15 by way of a controllable valve 17 and a flexible feeding tube 19 to a feed pipe 21 in the base plate 6.

An automatic controller 23 is connected to the monitoring unit 13, which, in dependence on the desired values supplied by a program transmitter 25, controls the fan 15 and/or switches it on and off and/or controls the aperture cross-section of valve 17.

To control the cooling output during a shutdown of operations, e.g., on weekends, the following criteria are those primarily determining: the cooling of the furnace overall should be as little as possible, in order to hold energy losses as low as possible. The temperature gradient through the bottom of the furnace in the region of the bottom electrodes should be held as small as possible, so as to limit thermal strains. On the other hand, the temperature on the surface of the bottom electrode, which may appropriately be measured by an additional temperature sensor 26, must not rise or drop, respectively, beyond specific maximum and minimum values. Lastly, the cooling and/or heating of the bottom electrode should take place as slowly as possible, in order to avoid thermal shocks. Taking these parameters into account, the controller 23, by way of the program transmitter 25, can be provided with a preset suitable temperature profile that is to be maintained during the standstill of operations.

Deviating from the form of the embodiment according to FIG. 1, several fans can be provided, that can be switched on and off independently of each other, and that have flow control valves which are controllable independently of each other.

A typical control sequence, but one to be understood as only an example, during a weekend shutdown of operations, using two fans with accessory valves, can be carried through, for example, as follows: During a first interval of 10–12 hours, starting with the last tapping of the furnace, both fans remain switched on and their valves remain fully opened. After the end of this interval, and during a second interval lasting until shortly before the restarting of the furnace, one fan is switched off and the valve of the other fan is controlled in such a manner that the temperatures of the electrode and/or contact pins 5, respectively, are maintained within a range of from 250° to 350° C. Any drop below this range is corrected by switching off the second fan, any upward deviation is corrected by increasing the cooling output. During a third interval of about 1–2 hours after re-ignition, both fans are operated and the valves are brought gradually from the closed to the open position, in order to obtain a slow rise of the temperature. During the melting operation thereon following, both fans are operated at full capacity and with open valves.

In FIG. 2, a temperature curve when applying the method of the invention is shown in a continuous line, in comparison with the variants of the method of operation heretofore customary, shown with broken and dash-and-dot lines, respectively. Point A indicates the time of the last tapping on Friday evening. When both fans remain in operation with fully opened valves during the entire weekend pause, as shown by the broken line curve, this leads to an extreme cooling off of the bottom electrode at G. To prevent this, the cooling unit can continue to be run at full capacity only up to a time B, according to the method of operation shown by the dash-and-dot line, and is then turned off completely. The heat stored in the sump remaining in the furnace leads to B to a steep temperature rise at the bottom electrode, and to a pause temperature clearly higher than the normal operating temperature, which only gradually drops again. About Sunday evening, at time C, the cooling unit is again put into operation at full capacity, so that a steep temperature drop starts, which passes to the normal operating temperature only several hours after start of operations on Monday morning.

In the method of operation of the invention, shown by the continuous line, already a few hours after the last tapping, at time D, a cooling opeation with reduced cooling output is started, which can continue over the entire weekend, or, in order to prevent too strong a cooling-off of the furnace, to a time E, e.g., on Sunday morning. If the cooling unit is then switched off completely, only a very moderate and slow temperature rise takes place, and a not so drastic subsequent drop until the new start of operation at point F.

Alterations of the embodiment described are possible within the framework of the invention. For example, the controllable valve 17 can be omitted, if, instead, the output of the fan 15 is continuously controlled. In addition, in a simplified form of embodiment of the invention, it is possible to omit the control device 23 and to manually operate the fan 15 and/or valve 17 with the aid of the data indicated by the monitoring unit 13.

While a specific embodiment of the invention has been shown and described in detail to illustrate the application of the principles of the invention, it will be understood that the invention may be embodied otherwise without departing from such principles.

What is claimed is:

1. A method for operating a direct current arc furnace having a bottom electrode and a cooling unit, comprising during the melting and tapping operations, operating the cooling unit to cool the bottom electrodes so as to maintain it at a substantially constant temperature, and during stoppages when melting and tapping operations are stopped operating the cooling unit at a reduced cooling output for at least a part of the stoppage.

2. A method according to claim 1, wherein the cooling unit is controlled at the start of the stoppage in such a manner that the temperature change of the bottom electrode does not exceed a predetermined maximum value.

3. A method according to claim 2, wherein the cooling unit is controlled during the preponderate part of the stoppage in such a manner that the temperature of the bottom electrode is maintained within a predetermined interval-temperature range.

4. A method according to claim 1, including continuously measuring the temperature in at least one location adjacent the bottom electrode and controlling the cooling output in dependence n the measured temperature.

5. A method according to claim 3, wherein the maximum value of the interval-temperature of the bottom electrode does not lie substantially above the maximum value of the permissible operating temperature of the material used in the bottom electrode.

6. A method according to claim 1, wherein the cooling unit is controlled at the end of the stoppage in such a manner that the temperature change of the bottom electrode does not exceed a predetermined maximum value.

7. A device for operating a direct-current arc furnace to maintain an electrode at a selective temperature, comprising a cooling unit mounted below the arc furnace providing a flow of a cooling medium over the electrodes, and a control device connected to said cooling unit regulating the flow of the medium, and means for sensing the temperature in the vicinity of the electrodes and regulating the control device in accordance with the sensed temperature.

8. A device according to claim 7, wherein said control means includes a controller having a program control unit connected thereto which resets the desired values of the temperature of the bottom electrode and effects the controlled operation of said controller on said cooling unit to operate the cooling unit in dependence of the sensed temperatures.

* * * * *